US006254054B1

(12) United States Patent
Few (10) Patent No.: US 6,254,054 B1
(45) Date of Patent: Jul. 3, 2001

(54) QUICK RELEASE MECHANISM FOR VEHICLE SEATING

(75) Inventor: Jeffrey P. Few, Elkhart, IN (US)

(73) Assignee: Norco Industries, Inc., Elkhart, IN (US)

( * ) Notice: Subject to any disclaimer, the term of this patent is extended or adjusted under 35 U.S.C. 154(b) by 0 days.

(21) Appl. No.: 09/159,302

(22) Filed: Sep. 23, 1998

Related U.S. Application Data
(60) Provisional application No. 60/061,096, filed on Oct. 3, 1997.

(51) Int. Cl.[7] .................................................. A47B 97/00
(52) U.S. Cl. ................................ 248/503.1; 296/65.03; 297/336
(58) Field of Search ................................ 248/424, 429, 248/430, 298.1, 503, 503.1, 501; 296/65.1, 63; 297/311, 440.22, 326

(56) References Cited

U.S. PATENT DOCUMENTS

| 1,735,518 | * | 12/1929 | Valkenburg et al. | 248/430 |
|---|---|---|---|---|
| 4,484,779 | * | 11/1984 | Suzuki | 297/326 |
| 4,529,159 | * | 7/1985 | Terada et al. | 248/421 |
| 4,805,952 | | 2/1989 | Coleman . | |
| 4,971,379 | * | 11/1990 | Rumpel et al. | 296/63 |
| 4,978,158 | * | 12/1990 | Kubo et al. | 296/65.1 |
| 5,152,571 | | 10/1992 | Kohler . | |
| 5,326,067 | | 7/1994 | Gonzalez . | |
| 5,330,245 | | 7/1994 | Boisset . | |
| 5,496,088 | * | 3/1996 | Stewart | 296/65.1 |
| 5,653,506 | * | 8/1997 | Wisner et al. | 248/503.1 X |
| 5,697,662 | * | 12/1997 | Leftwich | 296/63 |
| 5,711,505 | * | 1/1998 | Nemoto | 248/424 |
| 6,036,267 | * | 3/2000 | Downet et al. | 248/429 X |

* cited by examiner

Primary Examiner—Leslie A. Braun
Assistant Examiner—Tan Le
(74) Attorney, Agent, or Firm—Oldham & Oldham Co., LPA (57) ABSTRACT

A quick release mechanism for a conveyance seat comprising: a base plate rigidly attachable to a floor portion of a conveyance connected to a riser member by way of a cammed locking means. Wherein, the cammed locking means has a "T" lock that may be positioned so as to secure the riser member, and a locking cam which further secures the riser member by reducing the amount of sideways movement between the riser member and the base plate, and a compression cam which when rotated in a locked position pulls the "T" lock in an upward direction, and a spring which applies a force in a downward direction when the compression cams are in a lock position. The seat mechanism is further secured by a plurality of hub-like projections which may be received by a plurality of detents included in the base plate.

27 Claims, 7 Drawing Sheets

QUICK RELEASE MECHANISM FOR VEHICLE SEATING

This application claims the benefit of U.S. Provisional Application No. 60/061,096 filed on Oct. 3, 1997.

FIELD OF THE INVENTION

The present invention relates generally to assemblies used for mounting seats in motor vehicles, and more particularly, to a quick release mechanism that permits a passenger or an operator seat in the inside of a van or other conveyance to be easily unfastened and removed from the vehicle.

BACKGROUND OF THE INVENTION

In motorized vehicles such as vans or other big passenger vehicles, situations frequently arise where it is desirable to quickly disconnect and remove one or more of the vehicle seats to increase available cargo space or to permit easy access to certain interior portions of the vehicle, perhaps for maintenance and/or repair purposes. A number of inventions have been conceived that provide release mechanisms for seats to be selectively removed from within the interior of a vehicle.

One such invention, shown in U.S. Pat. No. 5,326,067, consists of a quick release pedestal for a vehicle seat, comprising a base member rigidly attachable to a floor portion of a vehicle and having first and second pairs of elongated slots extending in spaced, parallel relation. A seat support member is releasably attached to the base member and includes two pairs of members each having the general shape of a hook, and oriented so as to be receivable into respective slots. The seat support member also includes a mechanism for releasing the support member from engagement to the base member.

U.S. Pat. No. 5,152,571, discloses a mounting device for removably attaching a seat usable in a boat or other conveyance. The device includes a flanged lower plate which may be attached by screws, bolts or other means to the vehicle floor. The device further includes a flanged upper plate which at its top surface attaches to a seat base. The flanges at one of the ends of each plate contain a hole that receives a peg for fastening the flanges together. The flanges at the other of the ends of each plate contain a slot so that a latch can be moved vertically through the flanges allowing the plates to be disengaged. A user must align the latches with the slot and screw the latch in manually.

A detachable seat supporting structure is disclosed in U.S. Pat. No. 4,805,952, wherein a locking mechanism in the supporting structure uses two slots in a base plate fastened to the floor of a motor vehicle to releasably lock the seat into a secure position. A first locking mechanism rod is inserted into a U-shaped base plate slot with a detention at a bottom portion which provides a pivot point. The U-shaped slot allows the seat to be removed from the vehicle by lifting the rod out of the slot. A second locking mechanism rod associates with an L-shaped slot. The first and second rods are interconnected such that by rotating a handle on the second rod the rods move within the designated slots and provide a snap lock.

U.S. Pat. No. 5,330,245 discloses a movable, as well as removable, vehicle seat including a fixing mechanism for connecting the seat structure to the floor of a vehicle. The mechanism, which is mounted to move relative to the seat structure, includes a latch having a shoulder. The latch penetrates an opening in the vehicle floor and is capable of taking up either an unlocking position or a locking position.

The above mentioned inventions all permit a seat to be detached to allow greater room in the vehicle, and also to attach the seat to the vehicle for use. However, all of the inventions lack a mechanism which can be secured so that there is little movement between the base plate and the seat member. Also, the prior art fails to describe a seat mechanism which can be quickly situated and released. The present invention overcomes this and other deficiencies associated with prior art vehicle seat release mechanisms.

SUMMARY OF THE INVENTION

In accordance with a preferred embodiment of the present invention, there is provided a quick release mechanism for a seat of a vehicle. The mechanism generally comprises: a base plate which is rigidly attached to the floor of the vehicle; a riser member which releasably attaches at its bottom surface to the base plate and is secured at its upper extremities to the vehicle seat and a cammed locking means that is rigidly mounted to the interior of the riser member and that secures the riser member to the base plate.

The base plate is comprised of a thin, yet strong metallic material and is formed by stamping the material into a generally rectangular form having gently rounded corners and slightly flanged edges on all of its four sides. The base plate is also provided with a number of other features including: apertures that are located near each of the corners of the base plate; detents that are located proximate to the apertures; an elongated slot that is positioned in the central region of the base plate and a T-shaped opening that is situated to the side of the elongated slot. The apertures are used for securing the base plate to the floor of the vehicle with bolts or other types of fasteners. The elongated slot and the T-shaped opening receive elements of the cammed locking means to secure the riser member to the base plate.

Like the base plate, the riser member is fabricated from relatively thin metal plate. The riser member generally resembles a U-shaped channel having an elongated, horizontal base portion that when viewed from the top or bottom is rectangularly shaped, and two relatively flat side portions that extend upwardly from opposing ends of the base portion in a generally vertical direction. A plurality of hub-like projections are provided on the underside of the base portion and are located to coincide with the detents provided in the base plate. The hub-like projections are received by the detents and work in cooperation with them not only to align the riser member into locking position, but also to provide a means for engaging the riser member and the base plate. An elongated slot and a T-shaped opening are provided in the base portion of the riser member. The slot and the opening in the riser member correspond in size and location to the slot and opening provided in the base plate.

The cammed locking means includes a box-shaped frame through which passes a rotatable shaft. The shaft is provided with a handle portion which is created by a bend in the shaft that is outside of the box-shaped frame. The shaft is further provided with an extending tab and two compression cams, each of which cam is positioned at the outside surface of opposing end portions of the frame. The shaft also passes through a T-shaped locking tab that extends vertically downward and through a slot provided in the bottom side of the frame and that communicates with a spring positioned between a top portion of the frame and the upper end of the locking tab. The cammed locking means is positioned on the bottom portion of the riser member so that the extending tab is aligned with the elongated slot provided through the riser and the locking tab projects through the T-shaped opening.

The riser member is principally secured to the base plate by means of the T-shaped locking tab. When the hub-like projections of the riser engage the detents in the base plate, the elongated slot in the base plate receives the T-shaped locking tab of the cammed locking means. By rotating the handle portion of the shaft the compression cams are turned and thereby cause the shaft and the T-shaped locking tab to be moved upwardly so that the locking tab makes contact with the under side of the base plate. At the same time, the extending tab downwardly rotates to fit into the elongated slots in the base plate and in the riser member and thereby acts to reduce any lateral movement between the base plate and the riser member. The extending tab also ensures that the compression cams and the locking tab are secured in a locked position.

It is, therefore, an object of the present invention to provide a new and improved release mechanism for a vehicle seat, which may be quickly attached and detached.

It is yet another object of the present invention to provide a quick release mechanism for a vehicle seat, which is secure and allows minimal shifting or movement. Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
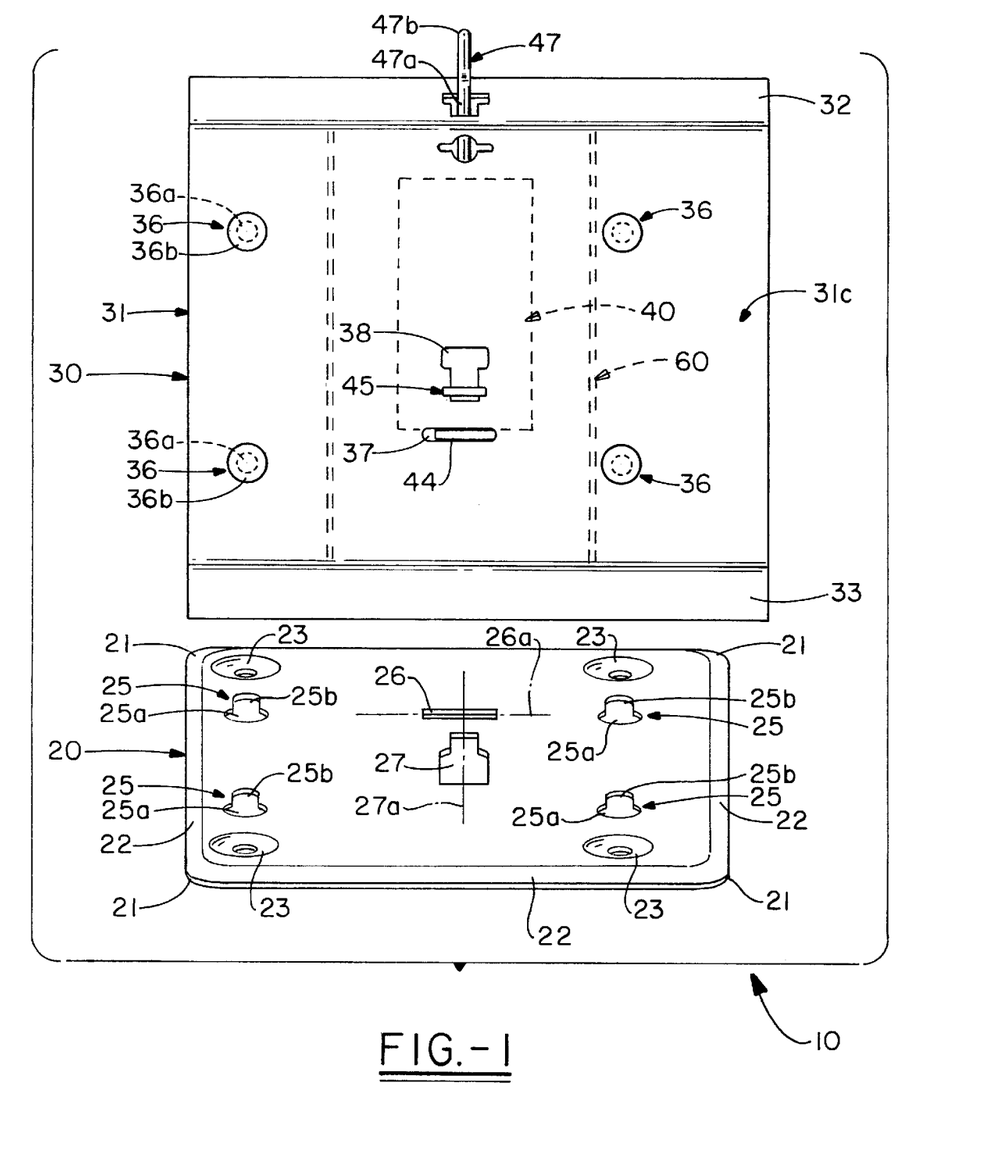
FIG. 1 is illustrative of the present invention which provides for a quick release mechanism wherein a base plate is shown in a top perspective view as it may be positioned relative to a riser member which is shown in a bottom plan view prior to the riser member being rotated downwardly on top of the base plate for locking engagement of the two.
Figure 2:
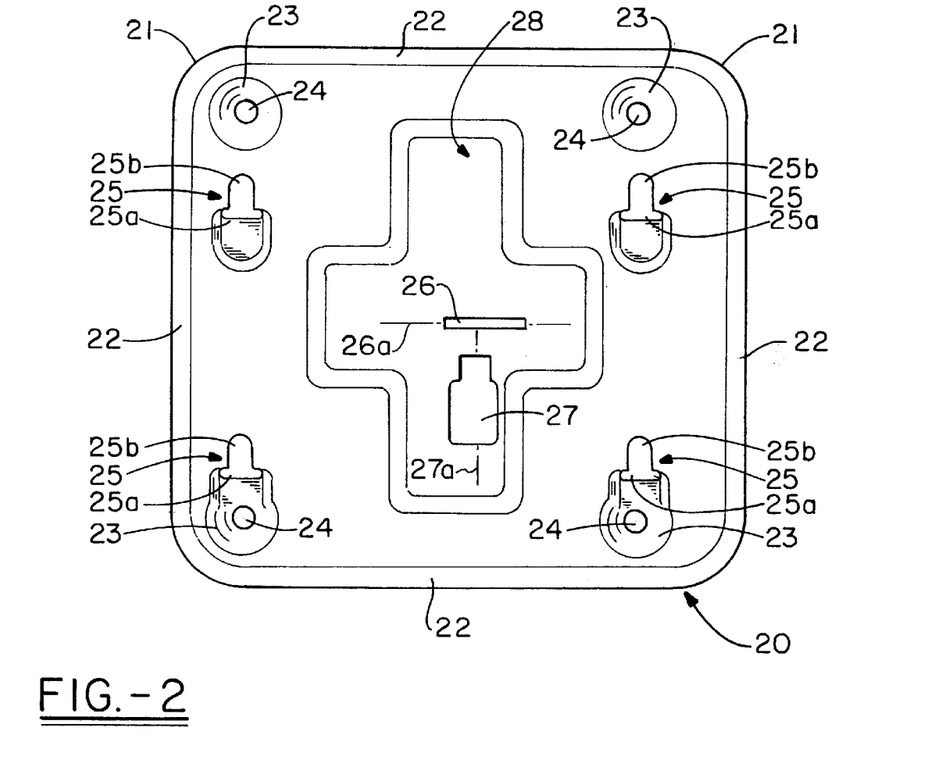
FIG. 2 is a top plan view of the base plate.

A quick release mechanism for a vehicle seat in accordance with a preferred embodiment of the present invention is indicated generally in FIG. 1 by the reference numeral 10. The mechanism 10 is comprised of a base plate 20, a riser member 30 and a cammed locking means 40. Base plate 20 is preferably stamped out of a sheet of metal such as steel, which may have a thickness ranging from 1 mm to 1 cm, and which preferably will range in thickness from 20 mm to 40 mm. As shown in FIG. 2, the base plate 20 has a generally rectangular form with gently rounded corner regions 21 and slightly flanged edges 22 on all four of its sides. The base plate 20 also has four depressions 23 which individually are located at its corner regions and are recessed downwardly toward the vehicle floor (not shown) so that the depressions 23 and the flanged edges 22 will make contact with the vehicle floor when the base plate 20 is installed. Thus the effect of the depressions 23 and the flanged edges 22 is to elevate other portions of the base plate 20 and thus prevent them from resting directly on the vehicle floor. Within each of the depressions 23 is a hole 24 intended to receive a bolt or similar fastener (not shown) for secure attachment of base plate 20 to the floor of the vehicle. Disposed about the periphery of the base plate 20 are at least four detents 25. Each of the detents 25 is comprised of two regions, the first being a downwardly recessed enlarged area 25a and the second being a narrowed throat area or notch 25b which is spatially positioned above and to the side of the enlarged area 25a. The detents 25 are positioned proximately to the depressions 23 and configured so that the center points of the semicircular portion of the notches 25b define the outline of a rectangle within the boundaries of the base plate 20. These detents 25 serve initially to orient the riser/cam assembly onto the base plate 20 during installation and later as a securing means. As shown in FIG. 2, some of the detents 25 may be situated such that they are in communication with the nearest of the depressions 23 while others may be located such that they are not.

The base plate 20 is further provided with an elongated slot 26 that is positioned in the central region of the base plate 20 and with a T-shaped opening 27 that is situated alongside the elongated slot 26 and oriented with respect to the elongated slot 26 such that the longitudinal dividing line 27a of the T-shaped opening 27 and the longitudinal dividing line 26a of the elongated slot 26 intersect at right angles. The elongated slot 26 and the T-shaped opening 27 will further be situated in a cross-shaped depression 28 provided for purposes which will be explained below.

Figure 3:
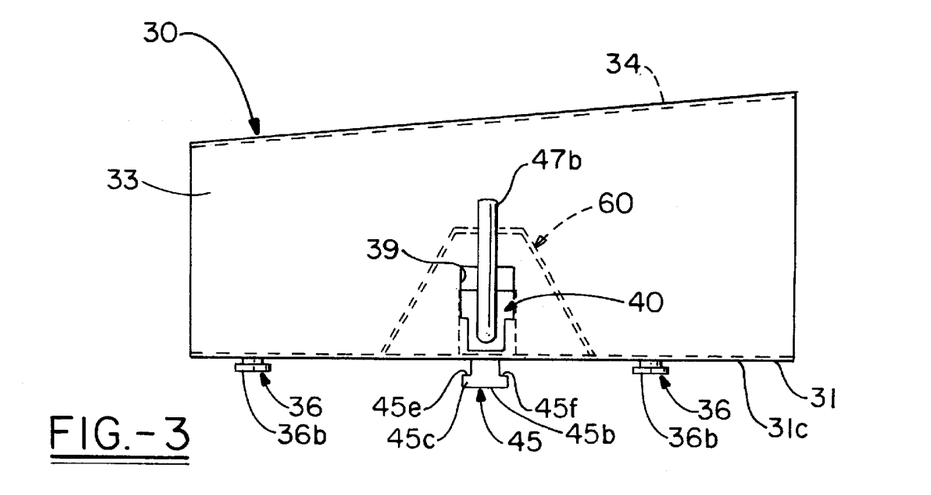
FIG. 3 is a side elevational view of the riser member.
Figure 4:
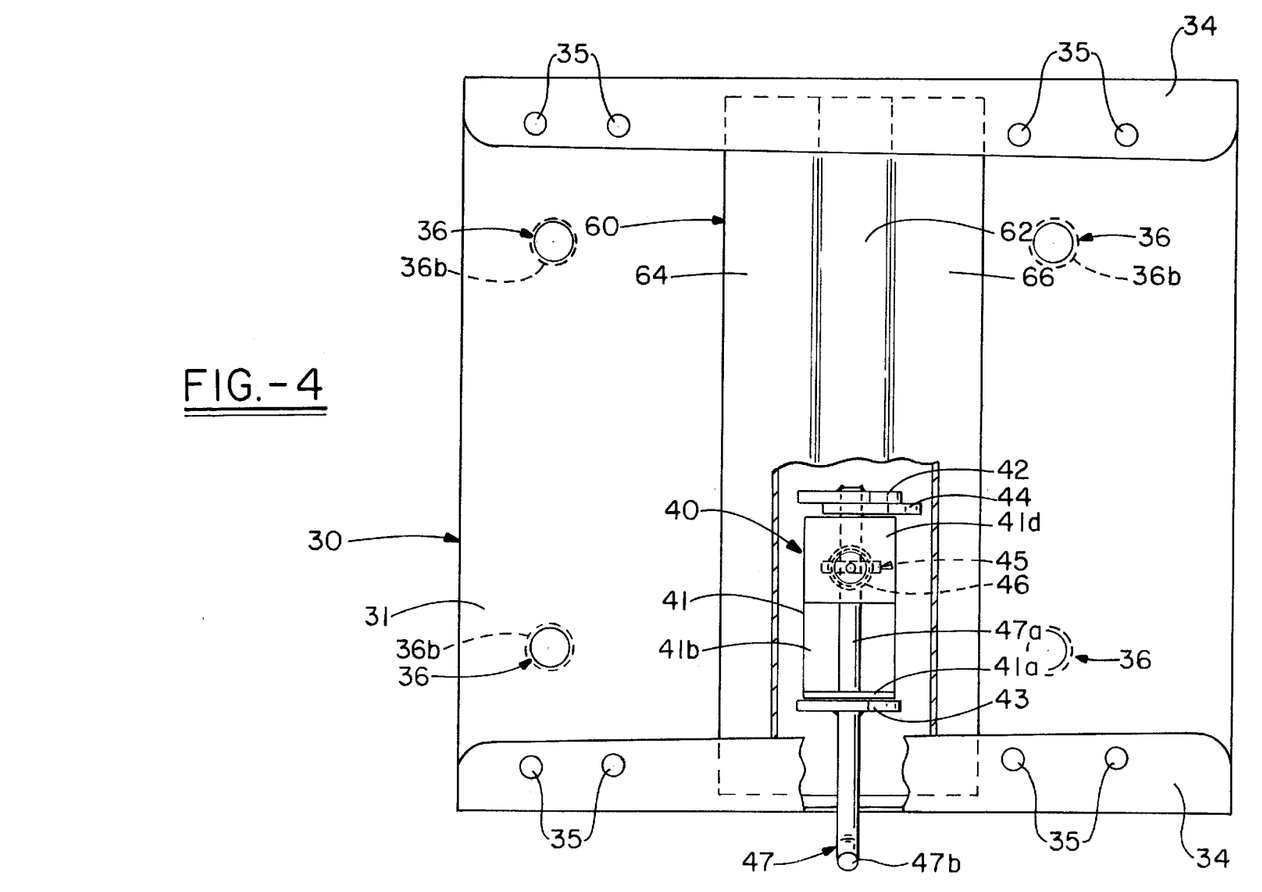
FIG. 4 is a top view of the riser member with a portion broken away to expose the cammed locking means which forms a primary part of the quick release mechanism.
Figure 5A:
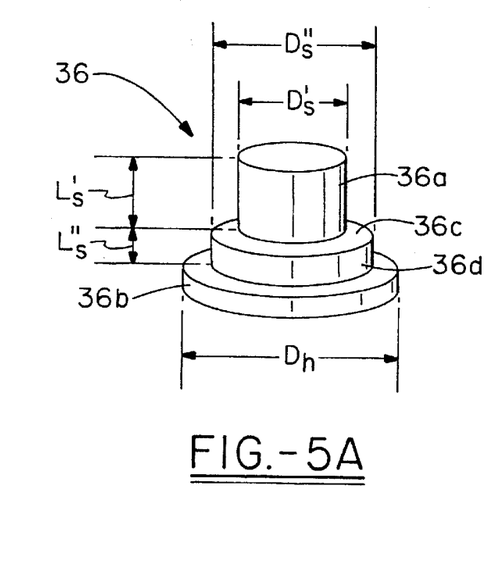
FIG. 5A is a perspective view of a hub-like projection of the riser member of the present invention.
Figure 5B:
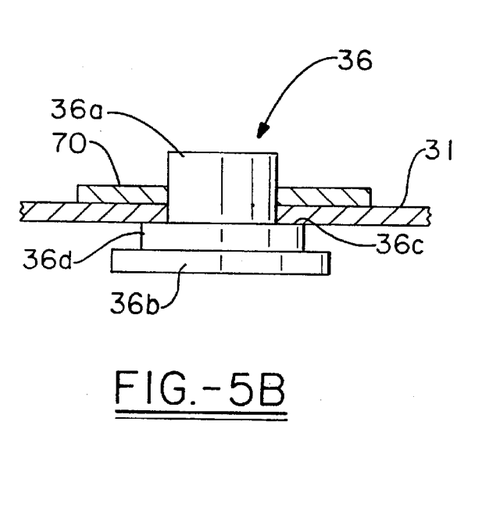
FIG. 5B is a side view of a hub-like projection shown in FIG. 5A as the hub-like projection would appear when it is installed in the base portion of the riser member.

The riser member 30, as shown in FIGS. 1, 3 and 4, preferably is also fabricated from a single piece of sheet metal stock such as steel and is subjected to stamping as well as bending forming processes. The riser member 30 broadly resembles a U-shaped channel having a rectangular, horizontal base portion 31 and two side portions 32 and 33 that extend upwardly from and form substantially equal but opposite angles a with opposing ends 31a and 31b of the base portion 31. The upper extremities of the side portions 32 and 33 of the riser member 30 are provided with bracket-like, horizontal extensions 34 that have a plurality of bores 35 capable of receiving fasteners such as bolts or screws (not shown) for fastening a vehicle seat to the riser member 30. In FIGS. 1 and 4, the extensions 34 are shown to be directed toward the interior of the riser member 30; however, the extensions 34 may be oppositely directed away from the interior of the riser member 30 if dimensions and possibly other physical characteristics of the seat so require. The angles α between the side portions 32 and 33 and the base portion 31 may also be varied in accordance with the size and other attributes of the seat to be attached.

On the underside 31c of the base portion 31, four hub-like projections 36 are provided. As shown in FIGS. 1–3, the projections 36 are arranged so that they will be received by the detents 25 provided in the base plate 20. As more clearly shown in FIG. 5, each of the projections 36 has a first cylindrical shaft portion 36a and a second increased diameter cylindrical shaft portion 36d that is provided at one of its ends with an enlarged, disc-like head portion 36b. The other end of each of the projections 36 is provided extends upwardly first through a hole in the base portion 31 of the riser member 30 and then through a back up washer 70 that cooperate with a force produced by the cammed locking memo to firmly urge the second cylindrical shaft portion 36d against the underside 31c of the base portion 31. Dimensionally, the first cylindrical shaft portion 36a has a diameter $D'_s$ that is smaller than the diameter $D_s"$ of the second cylindrical shaft portion 36d. The diameter $D_s"$ of the second cylindrical shaft portion 36d is slightly smaller than the width of the narrowed throat area 25b of the detents 25 in the base plate 20. Shaft portion 36a has length $L_s'$ and shaft portion 36d has a length $L_s"$ that permit the surface 36c of the disc-like head portion 36b to be situated at a distance from the underside 31c of the base portion 31, which is below the lower surface 29 of base plate 20 that is proximate to and thus defines the narrowed throat area 25b. The length $L_s"$ is at least equivalent to the thickness of base plate 20. The diameter $D_h$ of the disc-like head 36b exceeds the width of the throat area 25b. The foregoing dimensional parameters permit the first and second cylindrical shaft portions 36a and 36d of each of the hub-like projections 36 to be freely moved laterally into and out of the narrowed throat area 25b and vertically up and down with respect to the lower surface 29 of the base plate 20 when the cammed locking means 40 is in an unlocked state. The projections 36 may be fabricated from cylindrical pieces of metal stock by turning the stock on a lathe to provide the first and second cylindrical shaft portions 36a and 36d and the disc-like head portion 36b.

In the preferred embodiment of the invention shown in FIG. 1, the riser member 30 also includes an elongated slot 37 and a T-shaped opening 38 in the horizontal base portion 31. The slot 37 and the opening 38 in the base portion 31 are dimensionally similar to the slot 26 and the opening 27 in the base plate 20 and are located so that when the hub-like projections 36 are received by the narrowed throat areas 25b of the detents 25 the slots 26 and 37 and the openings 27 and 38 are vertically aligned.

Figure 6:
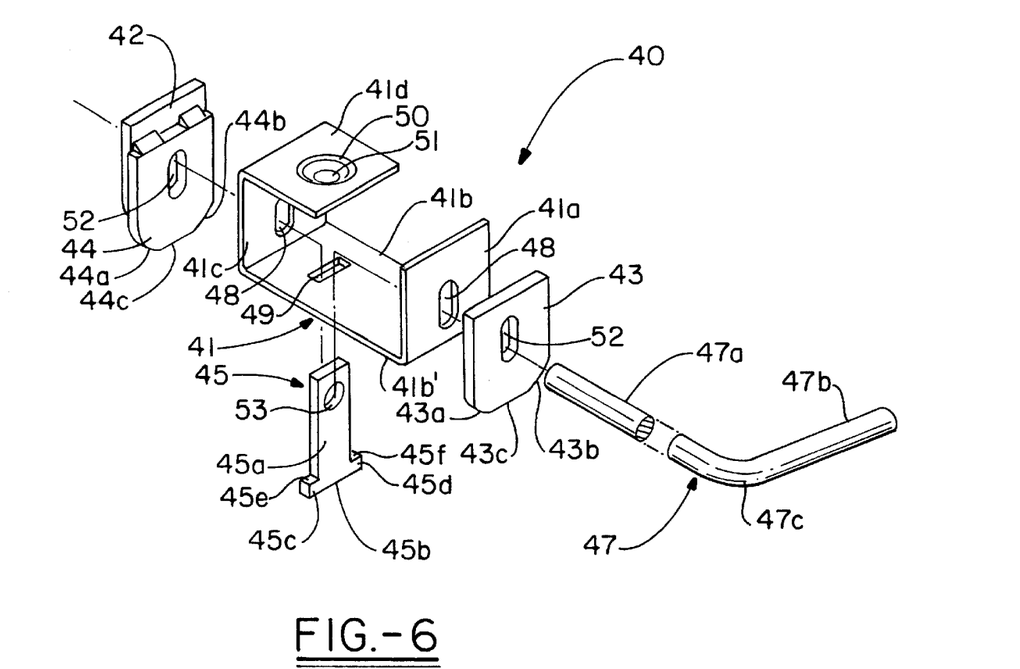
FIG. 6 is an exploded view of the cammed locking means of the present invention.

As shown in FIG. 6, the cammed locking means 40 essentially includes: a box-shaped outer frame 41; a pair of thin, plate-like compression cams 42 and 43; an extending tab 44 that generally resembles compression cams 42 and 43 but has a dimensionally longer longitudinal axis; a T-shaped locking tab 45; a spring biasing means 46 and a shaft 47. The outer frame 41 is created by bending an elongated strip of sheet metal to form a first vertical end portion 41a, a horizontal bottom portion 41b, a second vertical end portion 41c, and a horizontal top portion 41d. As may be seen by reference to FIG. 6, top portion 41d extends toward and makes contact with end portion 41a. End portion 41a and top portion 41d are fasted together by a weld, a tongue and groove tab or by any other suitable means. Additionally, the outer surface 41b' of the bottom portion 41b faces toward the base portion 31 of the riser member 30, causing the frame 41 to be open on two opposing vertical ends. The end portions 41a and 41c are each provided with vertically elongated openings 48 having semi-circular end portions. Horizontal bottom portion 41b is provided with a rectangular slot 49, and horizontal top portion 41d is provided with a downwardly extending depression 50 having a bore 51 in the central region thereof. The slot 49 and the depression 50 are positioned in their respective members 41b and 41d such that they are in vertical alignment with one another.

The compression cams 42 and 43 as well as the extending tab 44 are also fabricated from a thin metallic material and are generally rectangular in shape except for the rounded-off corner portions 42a, 42b, 43a, 43b, 44a and 44b that are provided between edges 42c, 43c and 44c. Like the first and second vertical end portions 41a and 41c of frame 41, the compression cams 42 and 43 and the extending tab 44 are also provided with circular openings 52. The T-shaped locking tab 45 is provided with an aperture 53 which is situated in the base portion 45a of the tab 45. (It should be noted that while the locking tab 45 of the present invention is shown to be T-shaped, alternative shapes may be suitable as long as the shape meets the objective of applying pressure from the bottom of base plate 20. Some other possible shapes include an "L" shaped tab or a "J" shaped tab.)

The shaft 47 may be considered to have three basic portions: a first straight portion 47a, a second straight portion 47b and a curved portion 47c that is intermediate portions 47a and 47b. It will be observed that dimensionally the first straight portion 47a is considerably longer than the second straight portion 47b and that the second straight portion 47b may thus function as a handle to cause rotation of the first straight portion 47a about its longitudinal axis.

Figure 7:
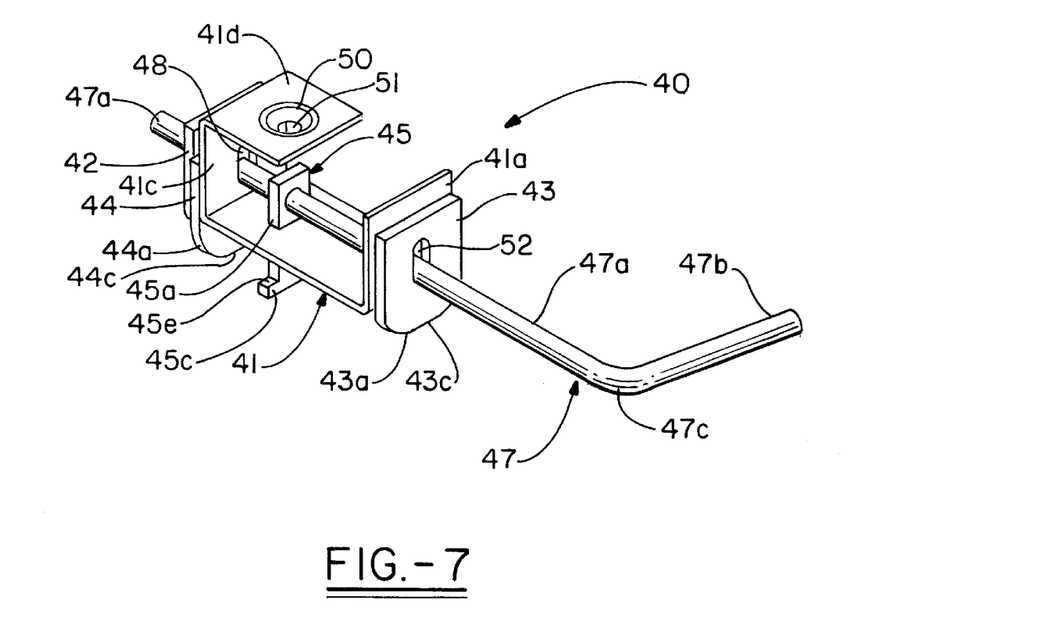
FIG. 7 is a perspective view of the cammed locking means of the present invention.
Figure 8:
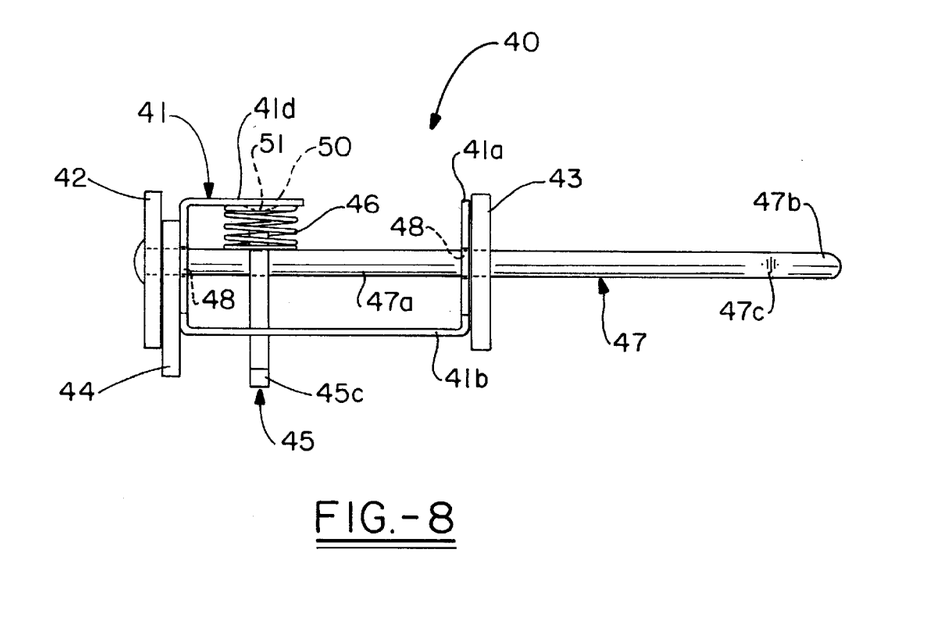
FIG. 8 is a side view of the cammed locking means of the present invention.
Figure 9:
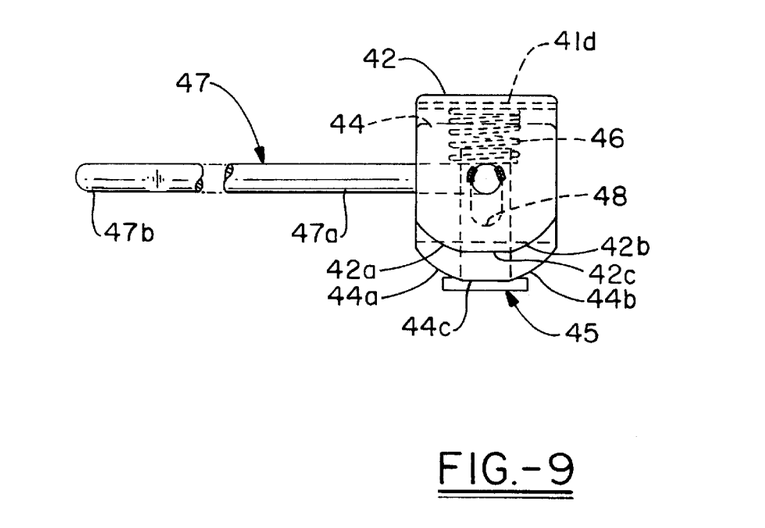
FIG. 9 is an end view of the cammed locking means of the present invention.

In its assembled state, the previously described elements of the cammed locking means 40 will appear generally as shown in FIGS. 7, 8 and 9. The compression cam 43 is positioned vertically adjacent to the first vertical end 41a of the outer frame 41 with the rounded corner portions 43a and 43b generally oriented downward toward the horizontal bottom portion 41b and with its opening 52 essentially aligned with the elongated opening 48 in vertical end 41a. The base portion 45a of T-shaped locking tab 45 is engaged in rectangular slot 49 of horizontal bottom portion 41b with the aperture 53 in general alignment with the elongated openings 48 in the first and second end portions 41a and 41c. The extending tab 44 is situated vertically adjacent to the second vertical end portion 41c of the outer frame 41 with the rounded corner portions 44a and 44b generally oriented downward toward the horizontal bottom portion 41b and with its opening 52 essentially aligned with the elongated opening 48 in vertical end 41c. The compression cam 42 is positioned vertically adjacent to the side of the extension tab 44 that lies directly opposite to that which is next to the second vertical end portion 41c. As may be clearly seen in FIG. 8, compression cam 42 and extension tab 44 are arranged such that their top edges lie in the same horizontal plane opening 52 of cam 42 is aligned with opening 52 of the tab 44. As in the case of the extending tab 44 and the compression cam 43, the rounded corner portions 43a and 43b of compression cam 42 are also downwardly directed toward the bottom portion 41b of the outer frame 41. Compression cam 42 and extension tab 44 are permanently affixed to each other and maintained in the above described arrangement by one or more welds or by any other means which are known in the art.

With the compression cam 42, the T-shaped locking tab 45, the extending tab 44 and the compression cam 43, positioned relative to the box-shaped outer frame 41 as indicated above, the first straight portion 47a of the shaft 47 is received first by the elongated slots 52 and 48 in the compression cam 43 and the first end portion 41a of the outer frame 41, next by the aperture 53 in the T-shaped locking tab 45, then by the slot 48 in the second end portion 41c of the frame 41, and finally by the opening 54 resulting from the assembly of the extending tab 44 and the compression cam 42. After passing through the opening 54, the end of the first straight portion 47a is extended slightly beyond the outer surface of the compression cam 42 where the end of the first straight portion 47a and the compression cam are firmly joined together by a weld or other any other suitable means known in the art. First straight portion 47a is also similarly joined to the compression cam 43; The first straight portion 47a and the T-shaped locking tab 45 are not rigidly fastened to each other, thus allowing straight portion 47a to rotate freely within the aperture 53 provided in locking tab 45. Spring biasing means 46, which in the preferred embodiment is shown to be a coil spring, is situated within the box-shaped outer frame 41 so that one of its ends is seated about the peripheral edge of the depression 50 provided in the central region of horizontal top portion 41d and so that the other of its ends receives the end of the base portion 45a of the T-shaped locking tab 45 that extends above the first straight portion 47a. It will also be observed that spring 46, being so arranged, will also make contact with the first straight portion 47a at two points on its periphery, which are on opposite sides of locking tab 45. In making such contact, spring 46 will tend to urge straight portion 47a of shaft 47 as well as locking tab 45 in toward the horizontal bottom portion 41b of outer frame 41 when spring 46 is free to expand. The spring 46 will preferably have a spring constant, k, that ranges in value from k=0.1 to approximately k=15. It will be noted that the higher the k value for the spring 46, the greater the compressive force there will be between riser member 30 and base plate 20, and thus the better cammed locking means will be able to prevent rattle or any vertical or sliding movement between riser member 30 and base plate 20.

Figures 10, 10A:
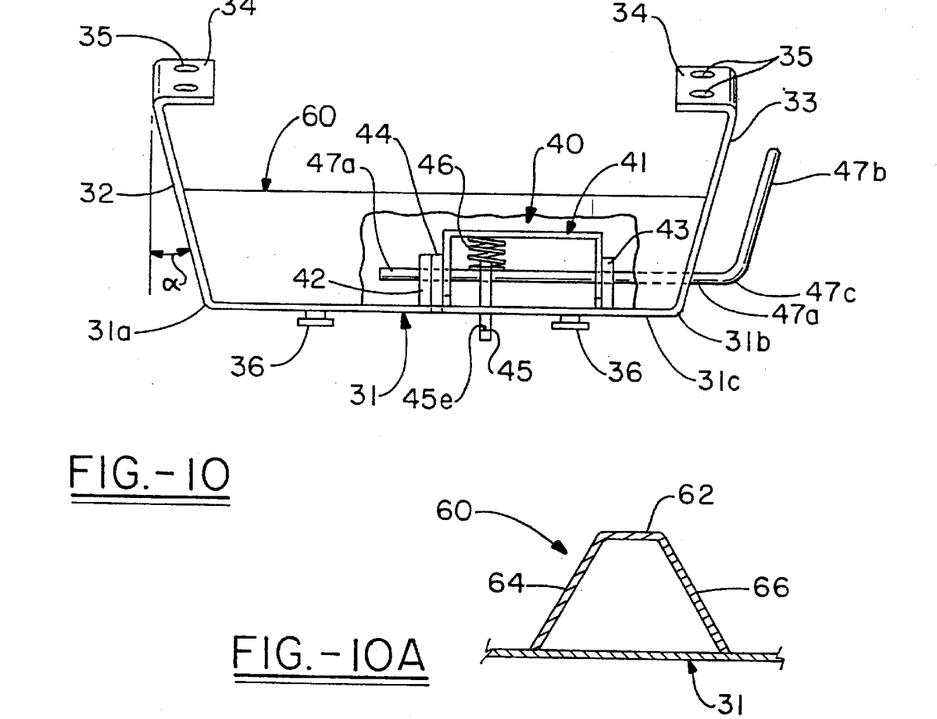
FIG. 10 cut away end view of the riser member of the present invention showing the cammed locking mechanism attached to riser means
FIG. 10A is a side cross-sectional view of the cammed locking means housing

As shown in FIGS. 3 and 10, cammed locking means 40 is placed upon the upper surface of horizontal base portion 31 of riser member 30 and oriented so that: a segment of first straight portion 47a of shaft 47 extends through a T-shaped opening 39 provided in the side portion 33 of riser member 30; the lateral portion 45b of the locking tab 45 extends through the narrow stem portion of the T-shaped opening 38 in the horizontal base portion 31; and the extending tab 44 is aligned with the elongated slot 37. Such placement of the cammed locking means 40 also causes the curved portion 47c and the handle portion 47b of the shaft 47 to project beyond the side portion 33 of the riser member 30. The cammed locking means 40 is kept firmly in the above described orientation by weld material that is deposited either continuously or at intervals along the opposing exposed edges of the bottom portion 41b of the outer frame 41 where they adjoin the horizontal base portion 31.

As shown in FIG. 10, the components of the cammed locking means 40 which are located to the interior of the riser member 30 may be enclosed within a housing 60 that extends upwardly from the horizontal base portion 31, towards the bracket-like extensions 34 and laterally between the side portions 32 and 33 of the riser member 30. The housing 60 acts to limit any particles such as dust, dirt or fluids from contacting the cammed locking means 40. The housing 60 when viewed from one of its ends (FIG. 10a) resembles an inverted, truncated "V" having a horizontal upper portion 62 and two angled side portions 64 and 66 extending therefrom. The housing 60 is formed from a single piece of sheet metal and its ends are provided with an angled contour that conforms to the angle of inclination α of the side portions 32 and 33. The housing 60 is secured at its edges to the riser member 30 by welding material applied by conventional welding techniques. Any other conventional means of attachment may also be employed.

Installation and removal of a vehicle seat which has already been attached to the bracket-like, horizontal projections 34 of the riser member 30 may be accomplished by simply fastening and unfastening the riser member 30 to the base plate 20. To fasten the riser member 30 to the base plate 20, the following steps will be taken. Each of the four hub-like projections 36 on the underside 31c of the horizontal base portion 31 of the riser member 30 is aligned with and inserted into a corresponding downwardly recessed enlarged area 25a of one of the four detents 25 provided in the base plate 20. Simultaneously, the lateral or head portion 45b and the lower end of base portion 45a of the T-shaped locking tab 45 are inserted into the cross member portion 27a of the T-shaped opening 27 in the base plate 20. The hub-like projections 36 are then moved laterally toward and into the narrowed throat area 25b of each of the detents 25 until the second cylindrical shaft portion 36d of each of the projections 36 makes firm contact with the semicircular edge of each of narrowed throat areas 25b. As such movement is occurring, the head portion 45b and the base portion 45a of the T-shaped locking tab 45 are translated laterally toward the narrow base member 27b of the T-shaped opening 27 in the base plate 20 so that the head portion 45b of the locking tab 45 is positioned below the edges of the narrow base member 27b of the T-shaped opening 27 and the base portion 45a of the locking tab 45 traverses the base plate 20 within the narrow base member 27b of the T-shaped opening 27. After such movement of the hub-like projections 36 and the T-shaped locking tab 45 has been accomplished, the handle portion 47b of the shaft 47 of the cammed locking means 40 is turned, preferably through an angle of 90 degrees, to cause compression cams 42 and 43 to rotate toward and make contact with the upper surface 31d of the horizontal base portion 31 of the riser member 30 (FIG. 11(a)). As the compression cams 42 and 43 are so rotated, the straight portion 47a of the shaft 47, which is free to move within the elongated openings 48 in first vertical end portion 41a and second vertical end portion 41c of outer frame 41, is forced move upwardly toward the horizontal top portion 41d of frame 41. Such upward movement of the straight portion 47a causes the spring 46 to become compressed and the T-shaped locking tab 45 to be upwardly translated. The compression cams 42 and 43 continue to be rotated until surfaces 45e and 45f formed by projections 45c and 45d of the head portion 45b of locking tab 45 make contact with the underside of base plate 20 at the edges of T-shaped opening 27.

Figure 11A:
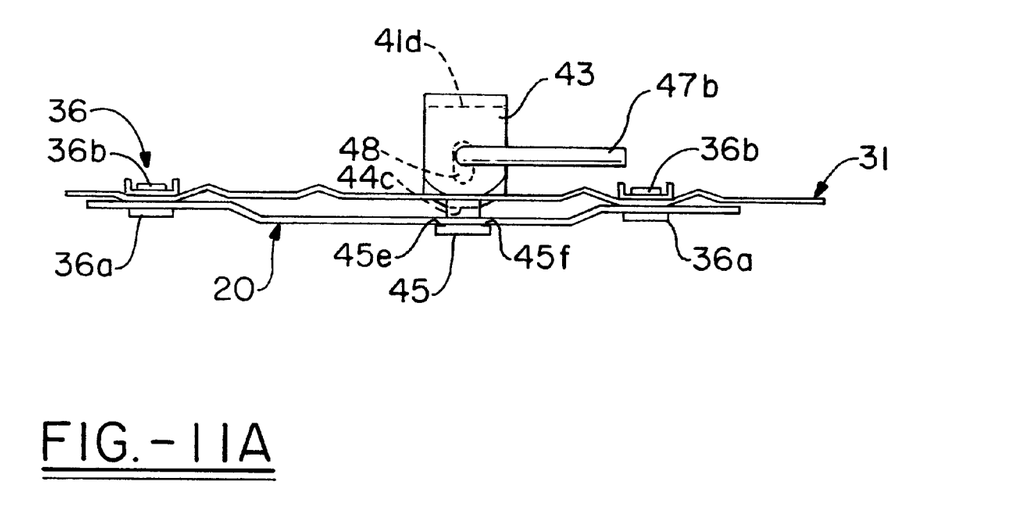
FIG. 11A is an end view of the cammed locking means as it is positioned within the riser member and on the base plate in a locked condition.

At the same time that the head 45b of the T-shaped locking tab 45 is being upwardly translated, the end of the extending tab 44 having the rounded-off corner portions 44a and 44b rotates downwardly first into elongated slot 37 in the horizontal base portion 31 of the riser member 30 and then into the elongated slot 26 in the base plate 20. The cross-shaped depression 28 in the base plate 20 is provided so that the T-shaped opening 27 and the elongated slot 26 are dimensionally separated from the bottom surface 31C of the riser member 30 at such a distance as will not only allow the extending tab 44 to be engages in the slot 26, but also result in the surfaces 45e and 45f of the head 45b to make firm pressing contact with the underside of base plate 20. With the extending tab 44 engaged in the slot 26 and the head portion 45b firmly pressed against underside of the base plate 20 and thereby securely drawing the riser member 30 and the base plate 20 together, the hub-like projections are maintained in the narrow throat areas or notches 25b of the detents 25 and vertical as well as sliding motion between the riser member 30 and the base plate 20 are prevented and the vehicle seat is held firmly in place.

Figure 11B:
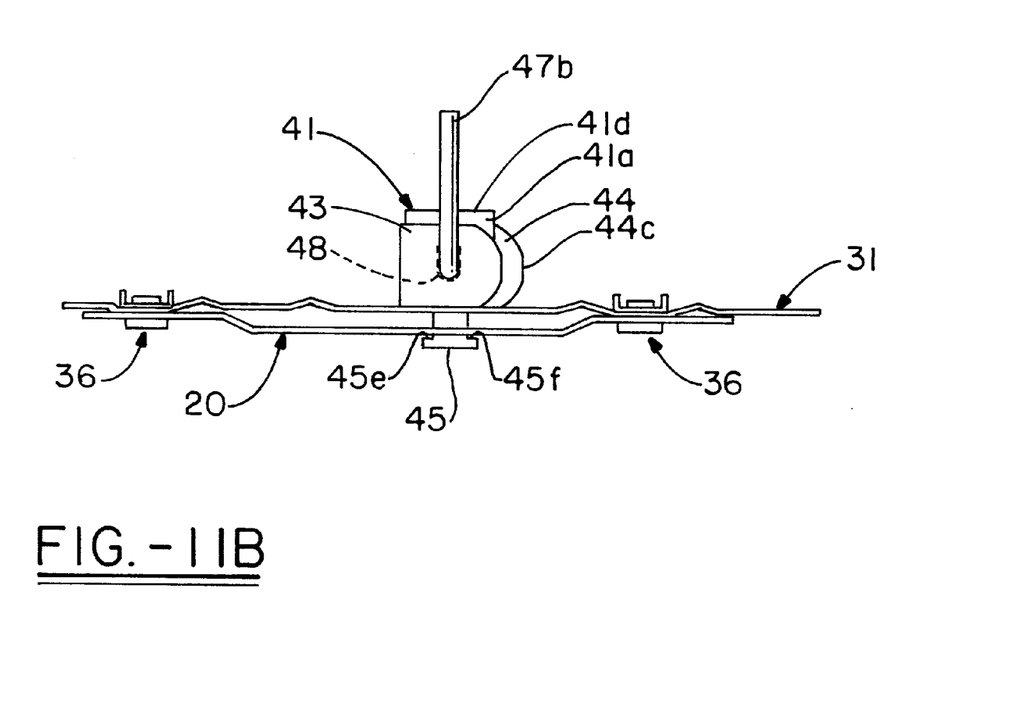
FIG. 11B is a view similar to FIG. 11A but showing the cammed locking means in the unlocked condition.

For removal of the vehicle seat, the riser member 30 need only be separated from the base plate 20. Separation may be accomplished easily and quickly by rotating the handle 47b in a direction opposite to that required to secure the riser 30 and the base plate 20 (FIG. 11(b)). Such opposite rotation of handle 47b causes the head 45b to translate downwardly away from surface 31c and the extending tab 44 to rotate upwardly and out of the slot 26. With the head 45b and tab 44 so disengaged, riser member 30 may be translated laterally so as to disengage projections 36 from the detents 25 and the riser member 30 with its attached vehicle seat may be lifted upwardly away from base plate 20. In a released configuration the longitudinal axes of the cams 42,43 and 44 will essentially be in a parallel orientation with the horizontal base portion 31b of riser member 30.

The dimensions of the quick release seat mechanism 10 and its respective parts will vary according the size of the vehicle, seat, or available room. The release mechanism 10 should be made of sturdy materials which can endure high levels of stress which will caused by weight of the person(s) sitting or other objects having weight on the chair. The preferred embodiment is fabricated from steel. Other alternative materials maybe used as long as they meet the desired objective of enduring high stress-strain. The preferred embodiment may also be coated with paint material that would resist rusting.

Although a preferred embodiment of the invention has been described above and illustrated in the accompanying drawings, it will be understood that the invention is not limited to the embodiment disclosed, but is capable of numerous rearrangements, modifications and substitutions of parts and elements without departing from the spirit and scope of the invention.

What is claimed is:

1. A quick release mechanism for a seat of a vehicle, comprising:
    a base plate adapted to ridgidly attach to the floor of the vehicle, said base plate having an upper and a lower surface and first and second locking apertures;
    a riser member which releaseably attaches at a bottom surface of said riser member to said base plate and is adapted to be secured to a vehicle seat;
    a means for locking said riser to said base plate, said locking means comprising a locking tab extending through said first locking aperture in said base plate, and a rotating cam assembly for selectively biasing said locking tab upward against said base plate lower surface; and,
    an extending tab which engages said second locking aperture as cam assembly applies bias to said locking tab.

2. A quick release mechanism as recited in claim 1, wherein said locking means further comprises a rotatable shaft member affixed to said rotating cam assembly.

3. A quick release mechanism as recited in claim 2, wherein said locking means further comprises a frame member, said frame member having apertures for receiving said rotatable shaft member and an aperture for receiving said locking tab.

4. A quick release mechanism as recited in claim 3, wherein said locking means further comprises a spring biasing means for biasing said locking tab downwardly and away from said base plate lower surface.

5. A quick release mechanism as recited in claim 3, wherein,
    said rotating cam assembly is adjacent said frame member.

6. A quick release mechanism as recited in claim 3, wherein,
    said extending tab is affixed to said rotatable shaft member adjacent said frame member.

7. A quick release mechanism as recited in claim 3, wherein said frame member further comprises a means for retaining said spring biasing means.

8. A quick release mechanism as recited in claim 1, wherein said rotating cam assembly is comprised of at least one camming member affixed to, and rotatable by a shaft member.

9. A quick release mechanism as recited in claim 1, wherein said riser member comprises:
    a horizontal base portion having an upper surface and a lower surface; and,
    at least two side walls, said at least two side walls extending upwardly from opposing edges of said horizontal base portion, and having a bracket-like horizontal extension, said bracket-like horizontal extension having a plurality of bores for receiving fasteners for securing a vehicle seat to said riser member.

10. A quick release mechanism as recited in claim 9, wherein one of said side walls further comprises an opening.

11. A quick release mechanism as recited in claim 1, wherein said base plate further comprises a plurality of depressions, each of said depressions having a bore for receiving a fastener for securing said base plate to a vehicle floor.

12. A quick release mechanism as recited in claim 1, further comprising a cooperating two part alignment means comprised of a plurality of projections and a plurality of corresponding detents, wherein said first part of said two part alignment means is located in a spaced apart relationship on said base plate and said second part of said alignment means is located in a corresponding relationship on said riser member.

13. A quick release mechanism as recited in claim 12, wherein each of said detents has a downwardly recessed enlarged region and a narrowing throat region, said narrowing throat region being in communication with said recessed enlarged region.

14. A quick release mechanism as recited in claim 1, wherein said base plate further comprises a centrally positioned, downwardly extending depression, within which said first and second locking apertures are formed.

15. A quick release mechanism as recited in claim 1, wherein said riser member further comprises a housing for said locking means.

16. A quick release mechanism for a seat of a vehicle, comprising:
    a base plate rigidly attachable to the floor of the vehicle, said base plate having an upper and a lower surface;
    a riser member which releaseably attaches at a bottom surface of said riser member to said base plate and is secured at its upper extremities to a vehicle seat;
    a cooperating two part alignment means comprised of a plurality of projections and a plurality of corresponding detents, wherein said first part of said two part alignment means is located in a spaced apart relationship on said base plate and said second part of said alignment means is located in a corresponding relationship on said riser member;
    means for locking said riser to said base plate; and,
    an extending tab which engages said locking aperture as cam assembly applies bias to said locking tab.

17. A quick release mechanism as recited in claim 16, wherein said base plate comprises a second locking aperture; and, said locking means comprises a locking tab which extends through said second locking aperture in said base plate, and a rotating cam assembly for selectively biasing said locking tab upward against said base plate lower surface.

18. A quick release mechanism as recited in claim 17, wherein said locking means further comprises a rotatable shaft member affixed to said rotating cam assembly.

19. A quick release mechanism as recited in claim 18, wherein said rotating cam assembly comprises at least one camming member affixed to, and rotatable by said shaft member.

20. A quick release mechanism as recited in claim 18, wherein said locking means further comprises a frame member, said frame member having apertures for receiving said rotatable shaft member.

21. A quick release mechanism as recited in claim 17, wherein said locking means further comprises spring biasing means for biasing said locking tab downwardly and away from said base plate lower surface.

22. A quick release mechanism as recited in claim 17, wherein said base plate further comprises a centrally positioned, downwardly extending depression, within which said locking apertures are formed.

23. A quick release mechanism as recited in claim 16, wherein said riser member further comprises:
   a horizontal base portion having an upper surface and a lower surface;
   at least two side walls, said at least two side walls extending upwardly from opposing edges of said horizontal base portion, and having a bracket-like horizontal extension, said bracket-like horizontal extension having a plurality of bores for receiving fasteners for securing a vehicle seat to said riser member.

24. A quick release mechanism as recited in claim 23, wherein one said side walls further comprises an opening.

25. A quick release mechanism as recited in claim 16, wherein said base plate further comprises a centrally positioned, downwardly extending depression, within which said locking aperture is formed.

26. A quick release mechanism as recited in claim 16, wherein said frame member further comprises a means for retaining said spring biasing means.

27. A method of releaseably attaching a vehicle seat to a vehicle, comprising:
   rigidly attaching a base plate to the floor of the vehicle, said base plate having an upper and lower surface and a first and second locking aperture;
   securing a riser member to said base plate by inserting a locking tab into said first locking aperture; and,
   locking said riser member to said base plate by rotating a cam assembly, biasing said locking tab against said lower surface of said base plate and engaging an extending tab with said second locking aperture.

* * * * *